Nov. 22, 1966 F. ROSENBLATT 3,287,649

AUDIO SIGNAL PATTERN PERCEPTION DEVICE

Filed Sept. 9, 1963 4 Sheets-Sheet 1

INVENTOR
FRANK ROSENBLATT

BY Stowell & Stowell
ATTORNEYS

INVENTOR
FRANK ROSENBLATT
BY Stowell & Stowell
ATTORNEYS

INVENTOR
FRANK ROSENBLATT

BY Stowell & Stowell

ATTORNEYS

INVENTOR
FRANK ROSENBLATT

BY Stowell & Stowell
ATTORNEYS 3,287,649
Patented Nov. 22, 1966

3,287,649

AUDIO SIGNAL PATTERN PERCEPTION DEVICE

Frank Rosenblatt, Brooktondale, N.Y., assignor to Research Corporation, New York, N.Y., a corporation of New York Filed Sept. 9, 1963, Ser. No. 307,675
3 Claims. (Cl. 328—55)

The present invention relates to apparatus and methods for simulating and investigating the complex mechanisms of the human mind. It is known and established that the nerve cells, or neurons, are the primary functional units of the brain. Further, pluralities of such cells, interconnected as neural networks having a plurality of synaptic junctions, respond to and translate minute electrical potentials—of the order of 100 millivolts—to produce neurophysiological phenomena such as set and attention, learning, association, memory, gestalt perception, and certain well-known electrocorticogram patterns.

The theoretical approach, and the building of a simulated brain model, depends, therefore, on providing model neural network configurations. Knowledge of the properties of the nerve cell is a requisite in theorizing about brain function. While numerous processes due to both chemical and electrical effects emerge from the main body of the cell, it will be sufficient for the present to consider the process in the associative area of the brain wherein an action potential is initiated by impulses impinging upon the cell body. The juncture between an incoming impulse and the cell body is called a synapse. Synaptic transmission involves a threshold effect, as well as spatial and temporal summation. If the single incoming or afferent impulse is insufficient to trigger the action potential, several impulses closely succeeding each other at different synapses of the same cell will likely do so. Not all synapses, however, are enhancing or excitatory; some have an inhibitory effect. Furthermore, after a cell has been fired, an "absolute refractory period" ensues while the cell is incapable of being fired no matter what the stimulation; this is followed by a "relative refractory period," during which the threshold is higher than normal. Thus a cell responds to increased stimulation, not with larger spikes, but with an increased frequency of discharge.

There is some evidence demonstrating adaptive features in the neuron, particularly on a short time basis. Repeated firing may change the threshold of a cell, or it may increase its rate of response to constant excitation. These properties could evidently hold the key to the nature of the memory trace, which still presents one of the most puzzling enigmas in neurophysiology.

The above considerations have led to the discovery that a program of theoretical logical analysis, computer simulation, and hardware implementation of a wide class of neural networks may be provided according to the present invention.

Therefore, the application of analogue memory mechanisms to a neural network is the primary object of the present invention.

A further and more specific object of this invention is to provide a so-called perceptron; defined in general as a class of minimally constrained nerve nets consisting of logically simplified neural elements. Such simulated nerve nets are capable of adaptive or self-organizing behavior.

A more limited object of the present invention, although a preferred embodiment thereof, is to progress from a simple three-layer, series connected, elementary perceptron suitable for visual pattern recognition, to a more sophisticated derivative thereof exhibiting brain-like characteristics suitable for speech pattern recognition.

The above and further objects and advantages of the present invention will become apparent from the following detailed description, taken in conjunction with the accompanying drawings in which the reference numerals denote corresponding parts, and wherein.

Figure 1:
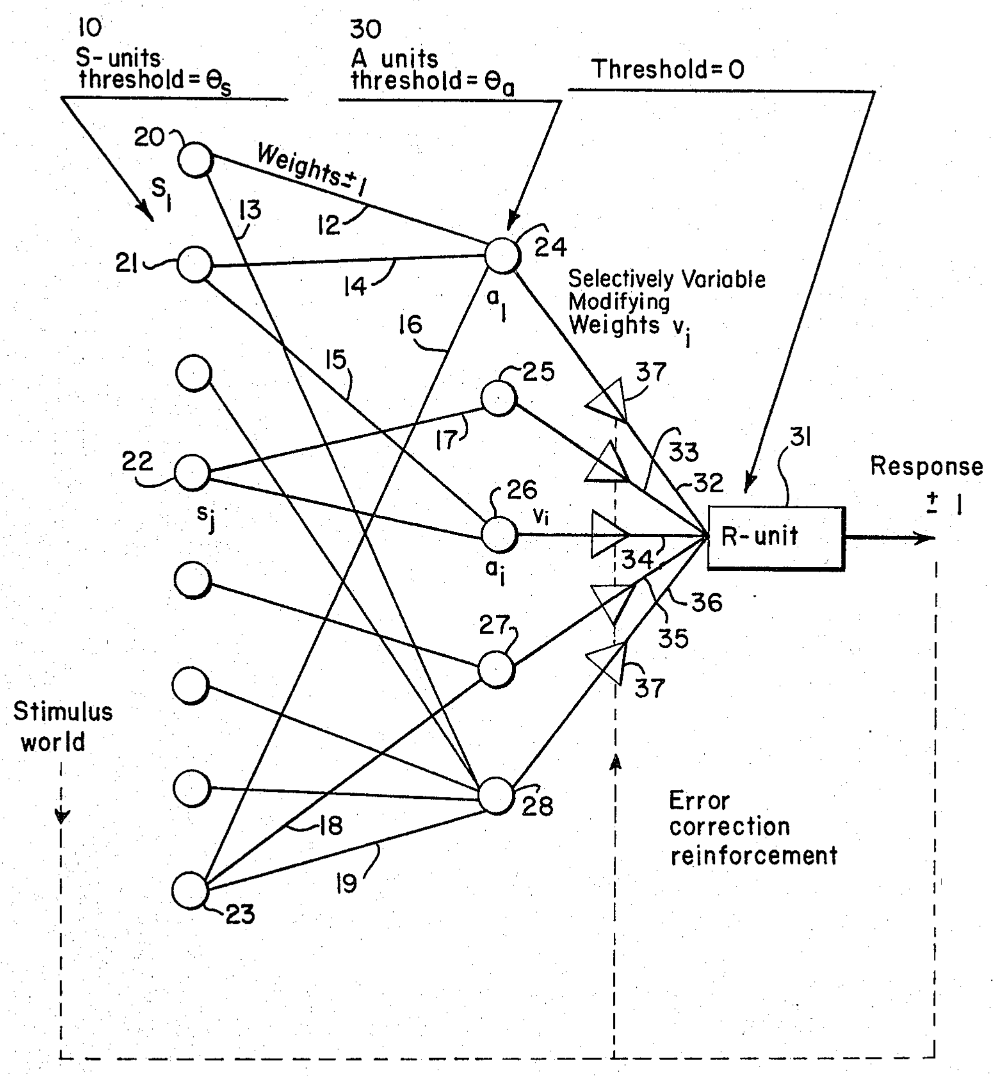
FIGURE 1 is a diagrammatic representation of a simplified form of a basic unit of the invention.

FIGURE 1 shows the network organization of a typical elementary perceptron. Perceptrons may, in general, be described in terms of (a) topological properties, i.e., connectivity; (b) signal propagation functions; and (c) memory functions, i.e., training rules. Various types of perceptrons, with differing systems of interconnections, feed-back loops, training rules, etc., have been developed in the yet initial stages of the art. In FIGURE 1 a simple three-layer, series connected, elementary perceptron is diagrammed. There are three layers of signal generating units which are highly simplified analogs of biological neurons.

Reference numeral 10 designates the sensory layer of S-units. Such sensory layer consists of a plurality of transducers of physical energy, such as a retina or mosaic of photoelectric cells; or a bank of acoustic filters fed from an audio input device. The sensory layer 10 responds to a pattern of physical energy in an environment, and each individual transducer thereof transmits the information impinging thereon which exceeds a predetermined threshold value $\theta_s$ to the next layer 30.

Reference numeral 30 designates the association layer of A-units. The connections from the S-units to the A-units are random in nature, and typically many-to-many. Such connections may be assigned by any one of a great variety of possible schemes. A plug board may be provided to facilitate such interconnections. The drawing indicates connections 12 and 13 from the S-unit 20 to A-units 24 and 28, respectively. Connections 14 and 15 lead from S-unit 21 to A-units 24 and 26, respectively.

In order to simplify the representation of the three-layer perceptron, all of the interconnections have not been numbered; however, their random nature will be readily apparent. Note that the individual S-units may be connected to a single A-unit or to many, and that the input connections to an A-unit may be single or many. Thus, A-unit 24 has input connections 12, 14, and 16; A-unit 25 has the single input connection from S-unit 22; while S-unit 23 has three connections 16, 18, and 19 leading to the respective A-units 24, 27, and 28.

The A-units are association units having a threshold $\theta_a$. Each A-unit 24 . . . 28 will emit an output pulse whenever the sum of the input signals thereto exceeds the threshold value $\theta_a$.

The connections from the sensory units to the association units, 12, 13, etc., may be either excitatory, carrying a positive signal, +1; or inhibitory, carrying a negative signal, −1. Each A-unit, 24, 25, etc., is connected to the third layer by a single connecting link. Reference numeral 31 designates this third layer, which is denominated as the response layer. The single R-unit 31 emits a signal of +1 or −1, depending upon whether the sign of its input signal, which is the sum of all signals arriving from the A-units, is positive or negative.

The connections from the association units to the response unit have variable weights or values, and this is indicated schematically by the weighting elements 37, which are inserted in the connections 32 . . . 36 leading from the several A-units 24 . . . 28 to R-unit 31. The signal transmitted by the A-unit, $a_i$, to the R-unit at time $t$ is equal to $a_i^*(t)v_i(t)$, where $a_i^*(t)$ is the output signal from $a_i$ at time $t$ (generally 1 to 0) and $v_i$ is the value of the connection from $a_i$ to the R-unit. The weights, $v_i$, are time-dependent variables, which are modified by a procedure for "training" the perceptron.

The training procedure generally used is called the error correction procedure. In this procedure, a set of stimulus patterns (patterns of S-unit input signals) is presented to the perceptron, in an arbitrary sequence. As each stimulus pattern occurs, it activates some set of A-units, which transmit their signals to the R-unit. Suppose such a pattern is presented and leads to a negative response $(-1)$ from the R-unit, when a positive response $(+1)$ is desired. In this case, the weights of all connections originating from active association units (for which $a_i^*=1$) have their weights augmented by a fixed increment, $\Delta v$. This will tend to make the total signal to the R-unit positive, the next time the same stimulus occurs, and consequently will tend to induce the proper response. Conversely, if a negative response is desired and the actual response is positive, every active A-unit has its weight reduced by $\Delta v$, which will eventually bring about a negative signal for this stimulus, giving the desired response again. Thus the weight associated with an A-unit is the time-integral of the reinforcement received by that A-unit during the training sequence.

If the obtained response is correct for a given stimulus, no change is made in the weights. It has been proven that if there exists some set of weights for the A-R connections which will lead to the correct response being given for every stimulus in the environment, the error correction procedure will always converge to such a solution, provided each stimulus keeps reappearing during the training sequence. Thus, it is possible to assign an arbitrary dichotomy to a set of patterns, and train the perceptron to give a positive response to all members of one class, and a negative response to all members of the opposite class. Perceptrons can be constructed which permit solutions to any dichotomy of an arbitrary set of stimuli.

The generalization of the simple perceptron to the case of multiple classifications, rather than simple dichotomies, is straightforward. A perceptron with eight binary response R-units has been used to demonstrate the properties of these networks in various pattern discrimination tasks. In this modification of the invention, four hundred photocells as S-units are arranged in a 20 x 20 mosaic, in the focal plane of a camera. These are random-connected to five hundred twelve A-units, which can be divided into sub-sets connected to each of the eight R-units. For simple dichotomies, all five hundred twelve A-units are generally connected to a single R-unit, to give maximum efficiency to the system.

Figures 2, 3:
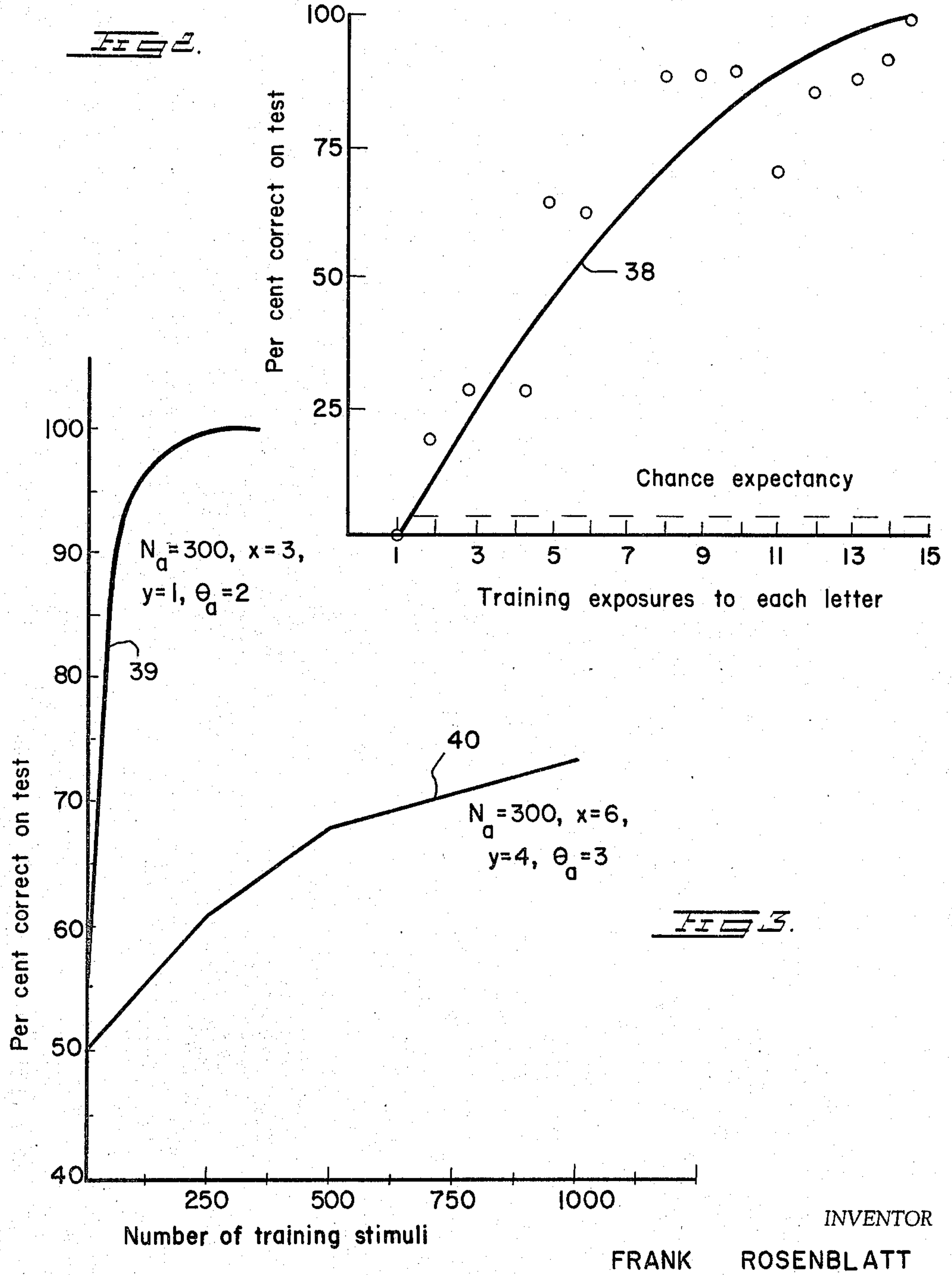
FIGURE 2 is a chart illustrating the learning curve of the signal perception device of the invention.
FIGURE 3 is a further chart illustrating the typical performance characteristics of the signal perception device of the invention.

Some examples of the performance of these systems are shown in the learning curves of FIGURES 2 and 3. FIGURE 2 shows the performance curve 38 of the above-described perceptron in learning all twenty-six letters of the alphabet, presented as block letters, in the center of the field. After it had seen each letter fifteen times in the training sequence, the system identified all letters correctly. If the patterns are not presented in a fixed position, as in this experiment, but are presented in all possible positions in the visual field, the task is considerably more difficult. FIGURE 3 shows an example of two such experiments. The first curve 39 shows the discrimination of 4 x 20 horizontal bars from 4 x 20 vertical bars, in all possible positions on a 20 x 20 "retina." The second curve 40 shows the performance in learning to discriminate squares from triangles, in all possible positions, on the same retina. These two curves were obtained by means of digital simulation of simple perceptrons with random connections from the S to A-units, and trained by means of the error correction procedure as defined above. In each case, the number of A-units ($N_a$) was three hundred. The number of excitatory connections ($x$) and the number of inhibitory connections ($y$) to each A-unit, and the threshold ($\theta_a$) were taken as close as possible to an optimum for each experiment, with the values thereof as indicated on FIGURE 3. Note that the problem of discriminating squares from triangles in all positions is very much more difficult than the problem of discriminating horizontal from vertical lines. Curve 40 represents the means of fifteen runs.

Figure 4:
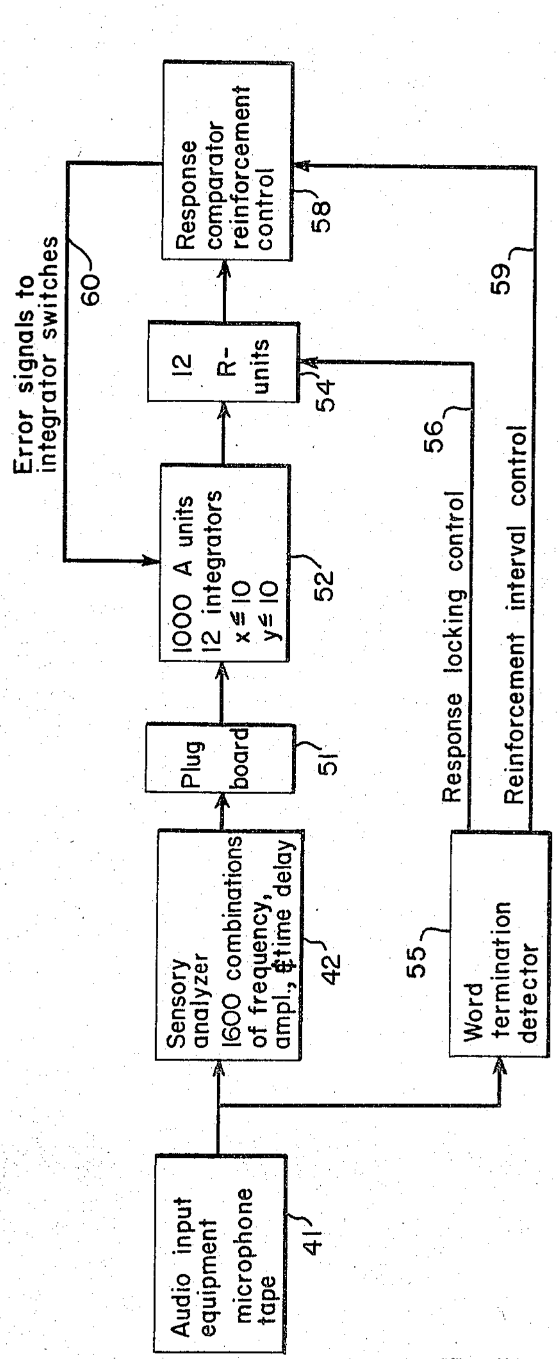
FIGURE 4 is a block diagram of a further system of the invention.

By adding a spectrum of time delays to the connections from S to A-units, temporal patterns as well as spatial patterns can be correctly classified, without modification of the basic principles employed by the perceptron. This feature is of particular interest in connection with the speech recognition problem. FIGURE 4 illustrates the basic design of such an audio perceptron.

The sensory input 41 of this perceptron comes either from a microphone or a tape recorder. Block element 42 contains sixteen hundred sensory points, corresponding to the S-unit photocells in the retina of a visual perceptron of the type illustrated in FIGURE 1. In the audio perceptron each of these S-points represents a distinct combination of a frequency filter, amplitude threshold, and time delay. Thus the complete configuration of signals in the sixteen hundred sensory points represents a sample of sixteen hundred points in a time-amplitude-frequency space. The organization of this input analyzer is shown in greater detail in FIGURE 5. There are eighty channels in all, each containing at element 43 a succession of twenty time-delay units which may take the form of one-shot multivibrators. A signal which leaves the microphone at 41 will be analyzed into appropriate frequency and amplitude components, generating a set of signals in the appropriate channels. These signals then propagate down the line of multivibrators in each channel, giving an output pulse from each stage in succession. For example, if a four hundred-cycle frequency component appears in the audio spectrum at time $t$, it will appear in those frequency channels which pass four hundred cycles at the given amplitude level. The greater the amplitude, the more channels that are activated up to a miximum of four in any one frequency band. An output pulse will then occur at the output of the first multivibrator in the four hundred-cycle line after several milliseconds; about ten or twenty milliseconds later the first multivibrator will cut off and the second will go on, etc. The delay time of each multivibrator is individually adjustable, and can be varied from about .01 to .1 second.

Of the eighty channels, seventy-two respond only to selected frequencies, and are fed from an AGC amplifier 44, which normalizes the amplitude of the input. These channels correspond, roughly, to an eighteen-channel vocoder with four levels of amplitude discrimination. The remaining eight channels carry amplitude information only, and are fed from an amplifier 45 which bypasses the AGC system, thus preserving information about over-all amplitude variations in the speech input.

A signal light 46 after the last delay unit in each chain indicates which channels are active at a given time, and can be used as an aid for analyzing the input, as well as for checking performance of the sensory channels.

Figure 5:
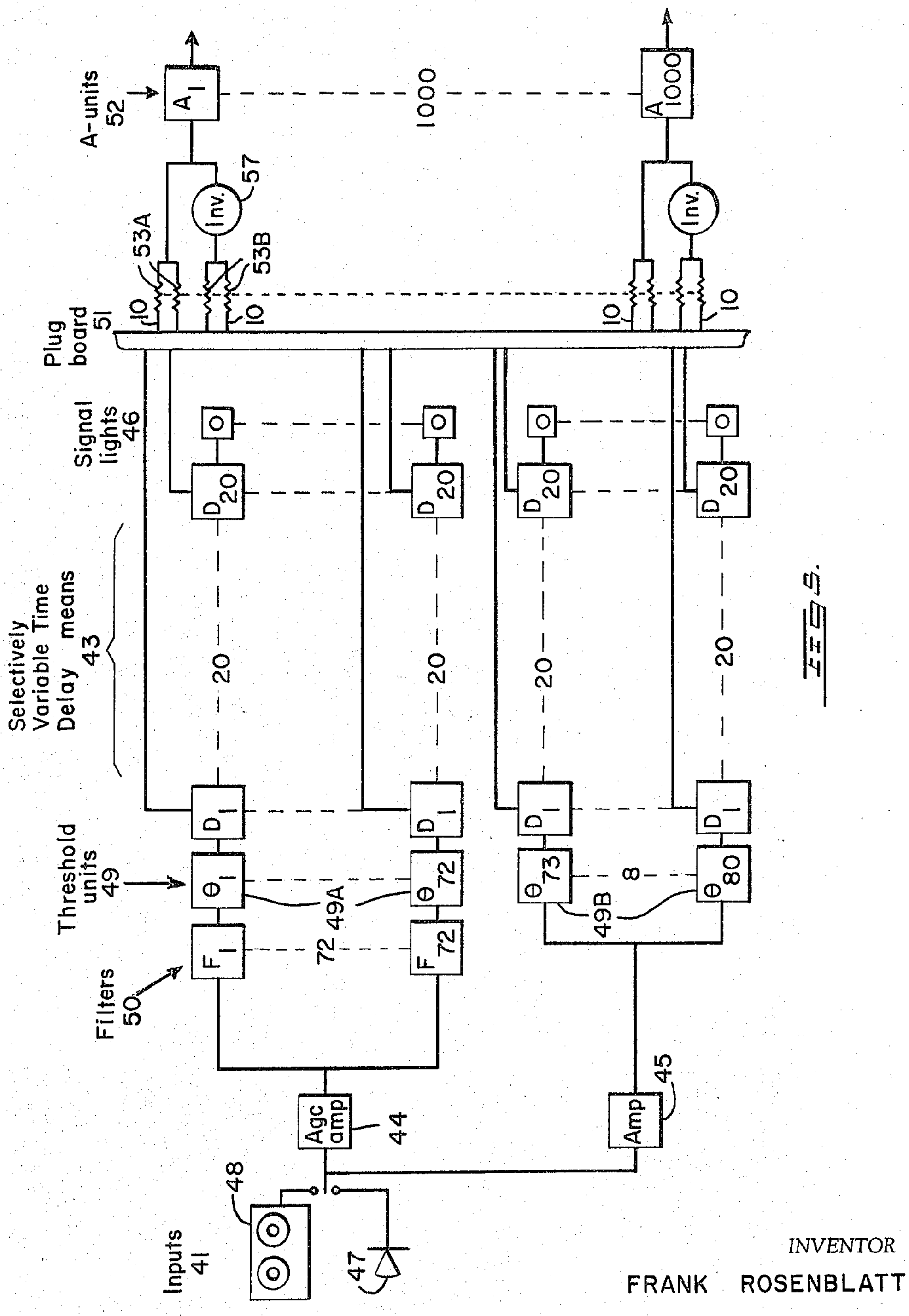
FIGURE 5 is another block diagram of a further system of the invention.

Thus, as shown in detail in FIGURE 5, the two alternative inputs at 41 may consist of a low impedance dynamic microphone 47 with a built-in blast filter, and a two-channel fully metered tape recorder 48 with automatic repeat mechanism and remote control. Normally the tape recorder will be used for training; one channel, tapped at the read head, will carry the stimulus words, while the other will be used for "start of word," "end of word," and "desired classification" signals, as well as for instructions to the operator.

The output of the tapehead is channeled to the automatic gain control amplifier 44 and the linear amplifier 45 in parallel. The AGC amplifier normalizes the amplitude in preparation for spectral breakdown, while the linear amplifier feeds the signal to eight threshold stages at elements 49B which may be unilaterally inhibited voltage comparators which retain the amplitude information lost during normalization.

The signal from the amplifier 44 serves as the input to seventy-two active filters 50. The center frequencies of these narrow band filters are distributed in the "useful" audio frequency range, from 80 c.p.s. to 6,400 c.p.s. Each filter is followed by a threshold stage 49A which may be a Schmitt trigger. The thresholds of adjacent frequency bands are set cyclically at one of four levels.

The Schmitt triggers 49A, and also the voltage comparators 49B used for amplitude detection, activate the first of twenty identical series-coupled delay units which make up the delay means 43. These may be monostable multivibrators, whose period may be varied from ten to one hundred milliseconds. Each delay unit drives the next one, and also serves as one of sixteen hundred input points to the plugboard 51 connecting the sensory units 42 to the association units 52.

On plugboard 51 the sensory mosaic is duplicated twenty-five times by means of parallel wiring. There are twenty sockets available for each A-unit, ten for excitatory and ten for inhibitory connections. The plugboard makes it possible to experiment with different sensory to association layer connection configurations; in addition, it could provide for eventual extension to inputs in other sense modalities.

The individually adjustable threshold devices of the A-units 52 may be provided by monostable multivibrator units with a period adjustable down to a minimum of ten milliseconds. The inputs from the plugboard are summed through resistors 53A and 53B. These inputs are all of the same polarity, but where transistor circuits are used the excitatory inputs from summing resistors 53A could be connected to the base of one of the transistors of the multivibrator, while the inhibitory links from summing resistors 53B would be connected to its emitter. The value of the threshold could be varied with a potentiometer. The circuit configuration of the monostable multivibrator is not part of the present invention, although obviously a solid state one, such as the transistor circuit, would be preferable due to space and heat considerations. Thus in FIGURE 5 a simple inverter stage has been shown at element 57 to provide the inhibitory connection.

When the sum of the input voltages to the A-unit exceeds its threshold, it is turned on for an adjustable period of a few milliseconds, so that the set of A-units which is "on" at any given time serves to characterize the time-amplitude-frequency pattern which is currently displayed by the set of S-units. Typically, these sensory patterns will correspond to periods of about a half second, so that a complete word can be displayed as a single sensory pattern.

Each A-unit 52 has a connection with a variable weight to each of twelve R-units. These twelve R-units 54 may be binary indicating devices, with an upper and a lower threshold. If their input signal exceeds the upper threshold, $+\theta$, the flip-flop is set to its "1" position; if the signal goes below the lower threshold, $-\theta$, the flip-flop is set to its "0" position. Otherwise, the state of the R-unit remains unchanged. This means that any particular R-unit will tend to hold its current state unless it receives a strong counter-indication from the A-units, forcing it to change. As an additional safeguard against changes in the response due to random noise effects after a word has terminated, the perceptron may optionally include a "word-termination detector" 55 which "freezes" or locks the state of the R-units 54 by means of the connection 56 after a short period of silence.

Thus, to explain the operation of the audio perceptron up to this point, the sequence of events when a word is presented is as follows: As soon as the first sound of the word has been uttered, the filters of the S-system trigger the initial delay units, and a spectral pattern begins to propagate down the delay chain. As the next sound comes in, it is fed into the delay lines as well, until the whole word is contained within the S-system. This sensory pattern continues to move along the delay chain, and finally moves out at the terminal end. As soon as the first delay-multivibrators begin to respond, however, a succession of active sets of A-units will be turned on, which corresponds to the succession of S-patterns. Before the entire word is contained within the S-system, the response of the R-units will be more or less random. As soon as the complete word is present, however, the perceptron should be able to give the correct response. A short fraction of a second after the word has terminated, the response of the perceptron is frozen, preventing its destruction due to random changes when the word trails out of the sensory display.

The succession of patterns in the S-system, after the word is spoken, constitutes an equivalence class, any member of which represents the identical word, slightly displaced in time. The object of training the perceptron is to teach it to give the appropriate response from each of the twelve R-units, for each member of this equivalence class. The effect of the word-termination detector is important in reducing the amount of training required, since it is not necessary for every position of the stimulus in the input display to give the correct response; the response must be correct only for the position which the word is in when the word-termination detector is activated. Thus, an error which occurs while the word is being fed in need not be corrected; reinforcement can be limited to the short period of a few milliseconds before and after the response is "frozen." Different utterances of the same word by different speakers will, of course, form another equivalence class, and the perceptron must be trained on a large sample of speech if it is to generalize properly from one speaker to another. In principle, the twelve R-units permit $2^{12}$ different output codes to be learned.

The use of variable weights in the connections between the A-units and the R-units was mentioned briefly above. Such weighting is performed by integrators associated with the A-units within block element 52. Various integrator means may be utilized, such, as, for example, electromechanical; Thermistor; photochromic; transpolarizer; flux integration with ferrites, toroids, multiaperture cores, MAD, etc.; charge integration in capacitors; Solions; electrolytic; or magnetostrictive.

There are twelve integrators provided on the output from each A-unit, as indicated by the legend within block element 52 in FIGURE 4. Thus, there will be twelve thousand integrators in all. In training the system, the correct response is set up in a response comparator 58. No reinforcement is permitted until the word-termination detector 55 signals over connection 59 that the complete word is in the S-system. Then the response of the perceptron is compared with the desired output code, and if there is a discrepancy in any one of the R-units, the integrators which feed this R-unit are corrected over connections 60 according to the error correction procedure for simple perceptrons. This correction is continued until the response either flips to the correct output, or the word-termination detector cuts off the reinforcement.

In order to economize on power, all integrators need not be actually incremented simultaneously, but the reinforcement pulse may be gated to each A-unit in turn by a counter, clock, or known distributor means in a rapid cycle. Since each reinforcement pulse lasts only 0.1 microsecond, all A-units can be reinforced once each millisecond, if necessary. The integrators for the erroneous R-units are selected by gating signals from the response comparator 58. Three sub-cycles may be provided by element 58, for positive reinforcement, negative reinforcement, and reading, respectively. In certain applications such gating sub-cycles prove unnecessary; the appropriate sign of reinforcement being determined by the R-unit comparators for the set of integrators connected to each R-unit, and reading taking place continuously. The brief output pulses which may be induced by the reinforcement signals can be eliminated by a suitable filter at the input to each R-unit.

The audio perceptron of FIGURE 4 has a lower bound of performance capacity to identify correctly at least several dozen words, regardless of speaker and intonation, if the words are not similar to one another. For example, the recognition of spoken digits should be performed with a reliability comparable to that of a human subject. An upper bound might be considerably beyond this, depending upon choice of vocabulary, and the consistency among the speakers employed in training and testing.

Other experimental applications of the audio perceptron system include discrimination of individual voices, regardless of what is being said, and recognition of individual meaningful discernible speech sounds or phonemes in a word. Experiments on speech segmentation are also possible, in which the perceptron is required to indicate whether an utterance consists of one word or two. Discrimination experiments need not be limited to human speech, of course; the system is equally capable of discriminating orchestral instruments, animal cries, sonar signals, or other auditory patterns.

Various modifications of the invention will occur to those skilled in the art; for example, one might add a visual input system to the audio preceptron to carry out experiments dealing with the association of visual and verbal input patterns. It should also be apparent that the three-layer preceptron may be expanded by making it the input stage of a larger multilayer arrangement; for example, a more sophisticated perceptron such as a five-layer system. Basically this would consist of two perceptrons in series, the output of one, the $A^{(2)}$ layer, forming the input of the second. The first perceptron may be taught or conditioned to learn to distinguish phonemes, and the second perceptron to recognize words as particular sequences of states in the $A^{(2)}$ layer. Such preliminary recognition of the phonemes would reduce the amount of variability in the sensory representation of a complete word, making it much easier to generalize from the utterance of a word by one speaker to the utterance of the same word by another speaker. It is clear that if a really large vocabulary is to be learned by a perceptron, it will be helpful to discriminate the phonemes before they are combined into words; thus a five-layer model would be capable of performing this task successfully.

It should be understood that the invention is not limited or restricted to the specific embodiments thereof herein illustrated and described, since these may be modified within the scope of the appended claims without departing from the spirit and scope of the invention.

I claim:

1. An audio signal pattern perceptron device comprising means for generating a signal, means for separating said signal into a plurality of discrete frequency bands, a threshold response unit for each such band, to thereby define a first plurality of threshold response units, the outputs of each said threshold response units existing only when the inputs thereto exceed a predetermined value, the output of each said threshold response unit coupled to a delay line, each said threshold response unit having its own distinct delay line, each said delay line composed of a plurality of individually variable time delay units which serially and sequentially trigger each other, said individual delay units in each said delay line generating an output when triggered, said outputs lasting each for a predetermined length of time, means for feeding said outputs to a second threshold response unit, said second threshold response unit being one of a second plurality of threshold response units distinct from said first plurality of threshold response units, whereby the signal received by each of said second threshold response units is the time and amplitude sum of the output of the delay line coupled thereto, and a final response unit coupled to a plurality of said second threshold response units.

2. The device of claim 1 wherein the outputs of some of said delay units, in each of said delay lines, are additive and some are subtractive with respect to the signal received by the second threshold response unit associated therewith, whereby both excitatory and inhibitory actions may be simulated.

3. The device of claim 2 wherein the coupling from the said plurality of said second threshold response units to the said final response unit includes at least one integrator switch means, said integrator switch means being responsive to a signal output from said final response unit.

References Cited by the Examiner

UNITED STATES PATENTS

| | | | |
|---|---|---|---|
| 2,879,476 | 7/1959 | Widess | 181—.5 X |
| 3,029,389 | 4/1962 | Morphet | 328—55 |

OTHER REFERENCES

"An Experiment In Learning," Electronics, pp. 57–59 and FIGS. 1A and 1B relied on.

ARTHUR GAUSS, *Primary Examiner.*

S. D. MILLER, *Assistant Examiner.*